W. G. GAGNÉ.
COOKER.
APPLICATION FILED APR. 21, 1910.

985,892.

Patented Mar. 7, 1911.

WITNESSES
Charles L. Foster
Mary C. Page

INVENTOR
William G. Gagné
by Clifford Verrill Clifford
Attorneys

UNITED STATES PATENT OFFICE.

WILLIAM G. GAGNÉ, OF PORTLAND, MAINE.

COOKER.

985,892.  Specification of Letters Patent.  Patented Mar. 7, 1911.

Application filed April 21, 1910. Serial No. 556,801.

*To all whom it may concern:*

Be it known that I, WILLIAM G. GAGNÉ, a citizen of the United States, residing at Portland, in the county of Cumberland and State of Maine, have invented a new and useful Cooker, of which the following is a specification.

This invention relates to improvements in cookers of the kind which are adapted to be used in connection with a tea kettle or other vessel adapted to contain water. It is designed to be used in connection either with the tea kettle or with kettles having larger openings and the object of this invention is to provide such a cooker having one or more compartments and adapted to be used with a kettle, basin or other vessel.

Figures 1, 2:
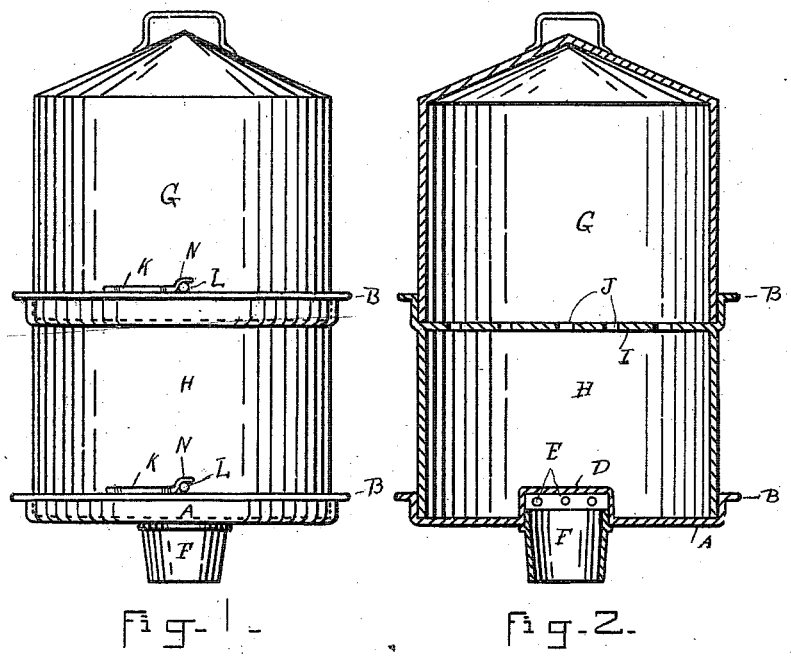
Figures 3, 4:
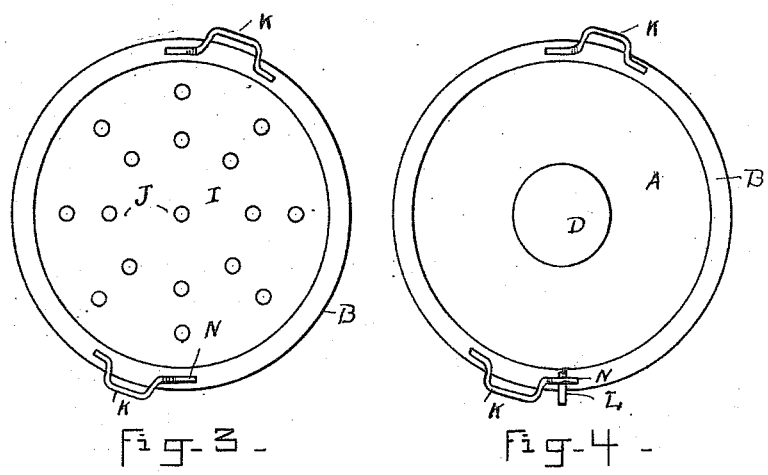

In the drawing herewith accompanying and making a part of this application, Figure 1 is an elevation of my improved cooker; Fig. 2 is a vertical central sectional view of the same; Fig. 3 is a plan view of one of the intermediate compartments, and Fig. 4 is a plan view of the base and handle and the locking pin of one of the compartments.

The same reference characters indicate like parts in the several figures.

In said drawings, A is the base centrally recessed and provided with a projecting flange B adapted to rest upon the edge of a kettle. The bottom of the base may be offset centrally and upwardly, as seen at D, the vertical walls of said offset part being provided with openings E. Projecting downwardly and centrally from the bottom of the base is a reduced tubular extension F adapted to enter and rest in the top of a tea kettle and thus support the base. The extension F may be removably inserted in the recess formed by the offset D in the center of the base, as clearly shown in Fig. 2. The openings E are preferably in the walls of the offset so that dishes containing articles to be cooked can rest upon the top of the offset without obstructing passage of steam from the kettle into the chamber. Adapted to rest removably upon the base is a cooking chamber G either directly or with one or more intermediate cooking chambers interposed between it and the base. In the drawings I have shown one main cooking chamber G and one intermediate chamber H. It will be understood that the intermediate chamber H may be dispensed with and only the one chamber G be used, resting directly upon the base. When an intermediate chamber is used it is open at the lower end and provided with a top I having perforations J through which steam may pass to the chamber above, the top I serving as a rest or support for various articles to be cooked or heated.

Secured to the flange of the base and intermediate chambers are hand holds K and secured to the chamber G and intermediate chamber H are hand holds L. The hand hold K may have one end projecting upwardly, as seen at N, Fig. 1, whereby it is adapted to engage the hand hold L and removably lock the parts together, the hand holds K and L serving as means for turning the one part relative to the other bringing hand hold L into and out of locking engagement with the offset N.

The operation of my improved cooking apparatus is as follows: When it is designed to be used in connection with a kettle or basin the flange B of the base rests upon the edge of the kettle or basin, as the case may be. When the apparatus is designed to be used in connection with a tea kettle which has a comparatively small opening, the tubular projection F is inserted in the recess formed by the offset and the projection F, preferably tapering to fit openings of slightly varying size, is introduced in the open top of the tea kettle. When only one cooking chamber is necessary the chamber G is used alone resting upon the base in the position occupied by the intermediate chamber H in the drawing selected to illustrate the invention.

My improved cooking apparatus has many advantages. The base is separable from the other parts. It is provided with an independent tubular projection, whereby it is adapted to be used with kettles having openings of varying sizes. Said projection is removable so that the base may be used upon a flat surface when desired, as for example when the cooker is to be used merely for warming purposes or for dry cooking. Another advantage is that, whether one or more chambers are used, the dishes containing the food are entirely exposed when the cooking chamber is removed, making it unnecessary to extend the hand down into the cooking chamber to remove the dishes. Another advantage is that the base and cooking chamber are removably locked together.

Having thus described my invention and its use, I claim:—

1. In a cooker, a base provided with a central reëntrant offset extending upwardly from the bottom, the vertical walls forming said offset being provided with perforations, said base being provided with a peripheral upturned flange, a cooking chamber open at the bottom adapted to rest on the base within said flange and provided with a perforated top and a peripheral upturned flange, and a cover adapted to rest on said chamber within said flange, whereby the contents resting on the top of the chamber or on the base are removable without reaching down into the vessel.

2. In a cooker, a base having a reëntrant recess in the bottom thereof provided with perforations in the vertical walls forming said recess, a collar removably inserted in said recess to a point spaced apart below said perforations and adapted to project below the bottom of the base, and a cooking chamber open at the bottom adapted to be removably joined to the base, whereby food or vessels containing food can be placed upon the recessed portion of the bottom without interfering with the passage of steam or heat into the cooking chamber.

WILLIAM G. GAGNÉ.

Witnesses:
C. W. Hussey,
Maybelle Haskell.

---

Copies of this patent may be obtained for five cents each, by addressing the "Commissioner of Patents, Washington, D. C."